J. DITSON.
CENTERING DEVICE.
APPLICATION FILED SEPT. 19, 1919.
1,367,360.
Patented Feb. 1, 1921.
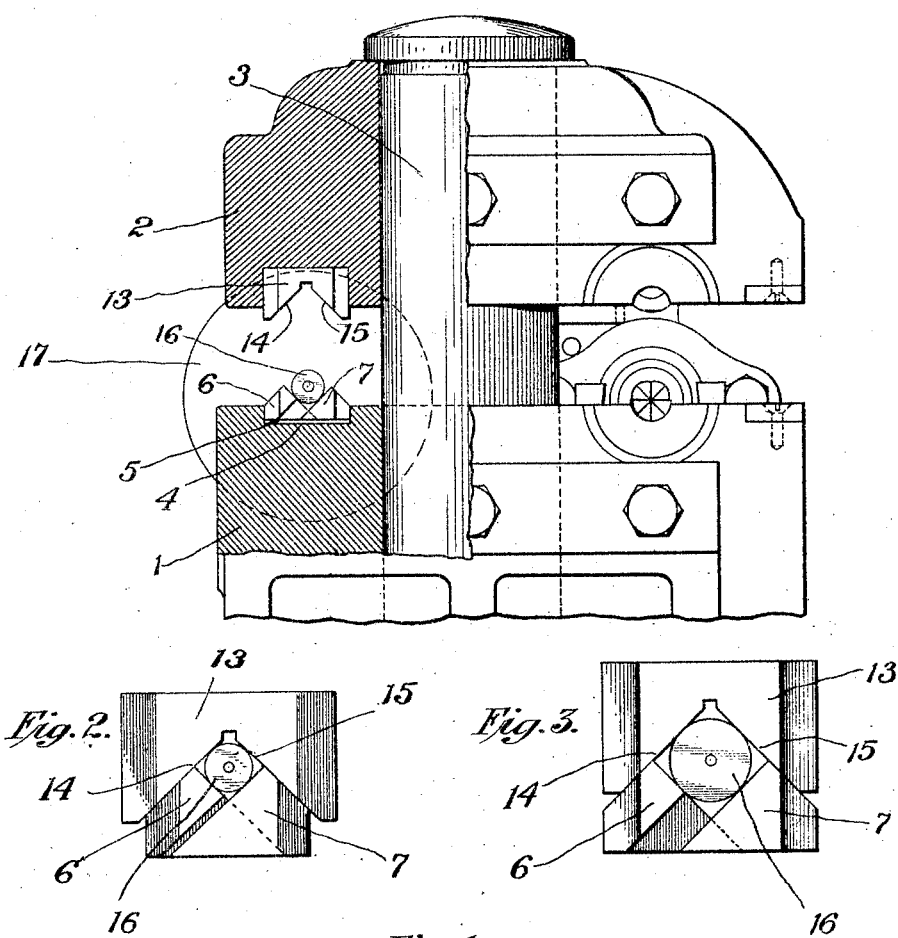
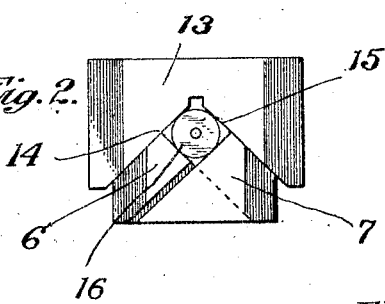
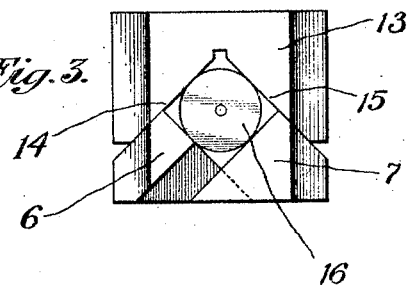
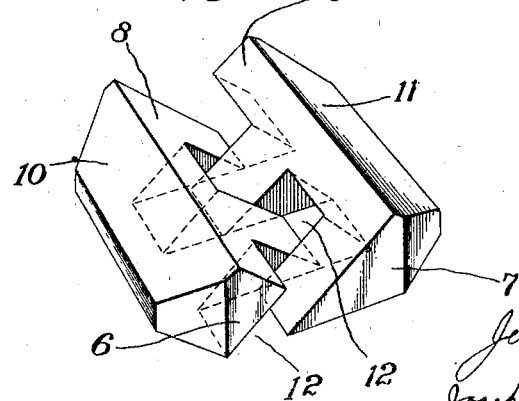
WITNESS
INVENTOR
Jesse Ditson
BY
Joseph K. Schofield
ATTORNEY

UNITED STATES PATENT OFFICE.

JESSE DITSON, OF LITTLETON, COLORADO, ASSIGNOR, BY MESNE ASSIGNMENTS, TO INGERSOLL-RAND COMPANY, A CORPORATION OF NEW JERSEY.

CENTERING DEVICE.

1,367,360.   Specification of Letters Patent.   Patented Feb. 1, 1921.

Application filed September 19, 1919. Serial No. 324,995.

*To all whom it may concern:*

Be it known that I, JESSE DITSON, a citizen of the United States, residing at Littleton, in the county of Arapahoe and State of Colorado, have invented a certain new and useful Improvement in Centering Devices, of which the following is a specification.

This invention relates to a positioning device for cylindrical articles and in particular to a device adapted to position an article and clamp it securely in a definite position so that its center will always lie in the same axis regardless of the diameter of the article.

The invention especially relates to a device for positioning hollow drill steels of different diameters in alinement with a reciprocatory pin provided in a drill sharpening machine so that the hole usually provided in the drill steel may be pinned out after the steel has been sharpened or forged.

More especially the invention relates to a centering device for the same purpose as that disclosed in my Patent Number 1,304,459 granted May 20, 1919.

The objects of the present invention are to provide a device that will be simple, compact and operable to properly position and clamp a drill steel accurately in position to be pinned out.

Further, to provide a centering device that will be operated by the action of the fluid operated vise to securely clamp the drill steel in position and that will also operate to position drill steels of different diameters accurately in position to be pinned out solely by the action of closing the jaw members of the fluid operated vise, so that with the clamping action of the vise completed the drill steel will be automatically placed in position and securely clamped.

With the above and other objects in view my invention consists in the features of construction and operation set forth in the following specification and illustrated in the accompanying drawings, forming a part hereof, in which:

Figure 1, shows a portion of a drill sharpening machine having the device of the present invention applied thereto, parts being shown in cross section;

Fig. 2, the centering members clamped about a drill steel or other article;

Fig. 3, the centering members clamped about a drill steel of larger diameter; and Fig. 4, a perspective view of the two lower movable members of the device showing the method of overlapping.

Referring now more particularly to the figures of the drawing, 1 refers to the body member of a drill sharpening machine having the present device applied thereto. At 2 is shown the movable jaw member of a fluid operated vise having attached thereto a piston rod 3. These parts are common to the usual form of drill sharpeners and will not require further description. Movement of the jaw member 2 is controlled in the usual manner by a piston attached to piston rod 3.

In the body member 1 of the drill sharpener which forms the stationary jaw member of the fluid operated vise is provided a depression 4, its lower or horizontal surface having a wearing plate 5 secured thereto. Slidable on the wearing plate 5 are two symmetrical angle blocks 6 and 7, the sides 8 and 9 of which form equally oblique angles to the horizontal. The outer sides of the blocks are also cut away at equal angles as clearly shown at 10 and 11. The surfaces 8 and 9 are each cut away at intervals forming depressions 12 permitting the overlapping of the angle members so that surfaces 8 and 9 can be brought more closely together.

A clamping member 13 is rigidly attached to the movable jaw member 2 directly over the angle members 6 and 7. This clamping member 13 is provided with a V-shaped notch the sides 14 and 15 of which are of the same oblique angle as the sides 10 and 11 of the angle members 6 and 7 and are sufficiently long to engage sides 10 and 11 in their extreme outer position.

It will be seen from the above that when the jaw member 2 is lowered the oblique sides 14 and 15 of the clamping block 13 will engage the outer oblique sides 10 and 11 of the angle members 6 and 7 thus forcing those members more closely together. It will also be obvious that as the V-shaped notch in the clamping member 13 is centrally over the angle members 6 and 7 and the angles of its sides 14 and 15 symmetrical and equal to the angles of the sides 10 and 11, the opening formed between the angle members 6 and 7 and the clamping block is central and its center remains always at the same height above the lower surfaces of the blocks 6 and 7.

If, then, a drill steel or other cylindrical article 16 is placed upon the angle members 6 and 7 and the jaw member 2 lowered until the clamping block 13 engages the angle members 6 and 7, it will force these members 6 and 7 together until the drill steel or other article 16 takes up on the oblique sides 14 and 15 of the clamping block 13. At this position of the clamping block 13 the article bears against both angle members 6 and 7 and also against the clamping block 13 at two symmetrical points. The center, therefore, of the article inclosed and clamped between these parts of the positioning means will always be at the same elevation above the wearing plate.

Referring now to Figs. 2 and 3, these figures show clearly the relative positions assumed by the parts of the device when articles of different diameters are clamped between them, the larger the article inclosed the farther apart the angle members 6 and 7 are located and vice versa, the smaller the article the closer the angle members 6 and 7 are forced. Further, the size of the article inclosed governs the height of the clamping block.

At 17 is shown the outline of a cylinder mounted on the sharpening machine by which is centrally mounted pin is adapted to be forced forwardly and backwardly. The elevation of this pin is fixed and immovable and as it is used for pinning out drill steels of different diameters, the center line of the drill steel must be brought in alinement with the axis of this cylinder.

The above described invention is adapted particularly for the above described use in connection with pinning out drill steels but it is obvious that it may be used anywhere that it is desired to position an article at a particular distance from another regardless of its diameter, or in a position so that its axis will always be in the same line and it is to be understood that while in the present showing and description there is disclosed but one specific embodiment of the present invention, other forms and modifications are included within the spirit and scope of the invention, as expressed in the appended claims.

What I claim is:

1. In a clamping and positioning device for articles, a pair of angle members adapted to move toward and away from each other horizontally, a clamping block movable vertically and engaging beveled faces of said angle members, movement downward of said clamping block forcing said angle members toward each other so both angle members and clamping block may clamp any one of a number of articles of different diameters between them with their centers at the same height from the lower surface of said angle members.

2. In a centering and positioning device for drill steel pinning out machines, a pair of symmetrical interlocking angle members adapted to slide toward and away from each other, a vertically movable block adapted to engage beveled surfaces of said angle members to force said angle members toward each other and clamp a drill steel therebetween.

3. In a positioning device for cylindrical articles, a pair of angle members adapted to slide toward and away from each other, a clamping block vertically movable and engaging beveled surfaces of said angle members, whereby when said angle members and block are in a position to clamp any one of a number of articles of different diameters therebetween the centers of said articles will be at the same height from the bottom of said angle members regardless of their diameters.

4. In a clamping and positioning device for articles, angle members adapted to move toward and away from each other, a clamping block movable in a plane at right angles to the plane of movement of said angle members, and engaging said angle members for moving said angle members toward each other, so that the angle members and the clamping block may clamp any one of a number of articles of different diameters between them with their centers at the same height from the base of said angle members, regardless of the diameters of said articles.

5. In a clamping and positioning device for articles, angle members adapted to move toward and away from each other, a clamping block movable in a plane at an angle to the plane of movement of said angle members and engaging said angle members for moving said angle members toward each other so that the angle members and the clamping block may clamp any one of a number of articles of different diameters between them with the centers of the articles at the same height from a fixed point at the base of said angle members regardless of the diameter of said articles.

In testimony whereof I have hereunto set my hand.

JESSE DITSON.